Aug. 30, 1966

J. D. RICHEY 3,270,132

OPTICAL SCANNING DEVICE UTILIZING OPTICAL FIBERS
DISPOSED IN A HELICAL ARRAY

Filed June 1, 1964

INVENTOR
J. D. RICHEY
BY
Roderick B Anderson
ATTORNEY 3,270,132
OPTICAL SCANNING DEVICE UTILIZING OPTICAL FIBERS DISPOSED IN A HELICAL ARRAY
James D. Richey, Whippany, N.J., assignor to Bell Telephone Laboratories, Incorporated, New York, N.Y., a corporation of New York
Filed June 1, 1964, Ser. No. 371,845
12 Claims. (Cl. 178—7.6)

This invention relates to the transmission of intelligence, and more particularly, to optical scanning devices for use in such transmission.

Scanning devices are widely used in communications systems such as television, facsimile, and various recording systems for giving visual displays of electrically transmitted data. Perhaps the best known scanning device is the cathode ray tube. Various alternative devices are also used because of the relative complexity of cathode ray tubes, their relatively short lifetimes, and the difficulties involved in using them to produce permanent recordings ad facsimiles. For these and other reasons, attempts have been made to display information contained in electrical signals by converting the electrical energy to a variable intensity light beam and then using the light beam to scan a photosensitive medium for forming the desired image. These devices require precisely ground reflectors and lenses which have generally proven to be unsatisfactory because of their rigorous fabrication requirements.

Accordingly, an object of this invention is an easily fabricated optical scanning device.

It is an object of one embodiment of this invention to compensate for defects in an optical scanning device which is used for making displays of periodic data.

It is an object of another embodiment of this invention to provide a simple facsimile transmission system.

These and other objects of the invention are attained by an optical film scanner comprising an array of flexible fibers capable of transmitting light, which will hereafter be referred to as optical fibers. One end of each fiber is mounted on the periphery of an annular cylinder with the other end mounted on a helical structure. The two mounts are connected by a rotatable central shaft. A photosensitive medium is advanced past the ends mounted on the helical structure. The scanner can be used for reproducing images by introducing light successively into the optical fiber ends mounted on the annular cylinder as the shaft is rotated. Light is then projected successively from the ends of the fibers mounted on the helical structure; this light produces desired scan lines on the advancing film because of the helical configuration of the ends of the fibers. As will become clear later, it is necessary that the light source be positioned with respect to the photosensitive medium such that light is directed into one end of a fiber at substantially the same instant that its other end is immediately adjacent the photosensitive medium.

This scanner is primarily intended to produce a visual image of a varying electrical signal. The electrical signal modulates the light beam that is introduced into successive fiber ends mounted on the annular cylinder. This results in scan lines of varying intensity on the photosensitive medium which are indicative of the varying intensity of the original electrical signal.

It is sometimes desirable to use the optical scanner described above for recording periodic or recurrent data wherein the periodicity or recurrence of the data is in synchronism with the rotation of the scanner. This may be desirable, for example, for recording seismographic and sonar data. However, in the absence of any special arrangement if one or more of the fibers were to break, the recurring data introduced into that particular fiber would be lost on each of the scanning operations. This could seriously limit the dependability of the device, whereas if the data were lost only on a single scan, the defect would normally be tolerable. I have found that by superimposing a slow oscillatory component to the scanner in addition to its steady rotation, recurring input light will be successively introduced into different optical fibers. Simultaneously, however, the scanning structure must be moved axially to compensate for the incremental angular displacement and thereby maintain the required relative orientation of the light input means, the optical fibers, and the photosensitive medium. These relative orientations will be maintained if the following relationship is maintained:

$$\frac{x}{\lambda} \sin \varphi \qquad (1)$$

where $x$ is the axial displacement under consideration, $L$ is the total length of a line interconnecting all the fiber ends located on the helix, $\eta$ is the angular displacement of the oscillatory component, $\lambda$ is the angle subtended by the line interconnecting the fiber ends mounted on the helix and $\varphi$ is the pitch angle of the helix. A specific cam mechanism in accordance with the invention for producing angular and axial oscillatory displacements which conform to Equation 1 will be described in the detailed description.

My optical film scanner can also be modified to transmit electrical signals which are representative of an image. For example, partially transparent paper having an image thereon may be located between a source of light and the optical fiber ends mounted on the helix structure. As the scanner is rotated, successive fiber ends on the helix structure receive light of varying intensities which are transmitted to the ends mounted on the annular cylinder. A photocell receives light from successive fiber ends mounted on the annular cylinder and converts it to electrical energy which is representative of the image scanned by the optical fibers. This image may be reproduced by the reproducing optical scanner described above. When a transmitting optical scanner and a receiving optical scanner act together to transmit and reproduce an image, they constitute a facsimile system which gives advantages of simplicity over many existing facsimile transmission systems.

These and other objects and advantages of my invention will be more clearly understood from a consideration of the following detailed description, taken in conjunction with the accompanying drawing in which.

Figure 1:
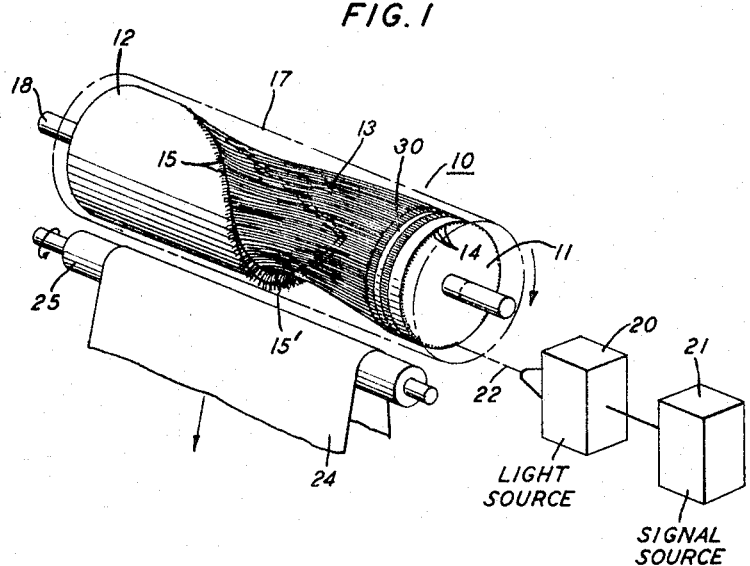
FIG. 1 is a schematic view of an optical scanner in accordance with the principles of the invention.

Referring now to FIG. 1 there is shown schematically an optical scanner 10 comprising a cylindrical mounting member 11 and a helical mounting member 12. The mounting members support a plurality of optical fibers 13 each having a first end 14 which is mounted on the periphery of cylindrical mounting member 11, and a second end 15 which is mounted on the helical surface of mounting member 12. The helical mounting member may be formed from a hollow cylinder which has been cut at an angle to form a helical surface upon which the second ends 15 of the optical fibers are to be mounted.

Optical fibers 13 may be any of a number of known types which are capable of transmitting increments of light along a tortuous path without substantial attenuation or distortion. Preferably, each fiber 13 is actually a bundle of optical fibers, known in the art as a multifiber. The preferred multifiber has a diameter of .0024 inch and contains 36 glass fibers each having a diameter of .0004 inch.

The scanner comprising the mounting members and the optical fibers are encapsulated in an epoxy 17 which is designated by dotted lines for purposes of clarity. This assembly is rigidly mounted on a drive shaft 18 which, during operation, is rotated at a relatively high rate of speed.

Located adjacent one end of the mounting member 11 is a modulated light source 20 for projecting a light beam 22. The intensity of the light beam delivered by this source is modulated by electrical current from a signal source 21. During operation, the light beam 22 is directed into successive first ends 14 of the optical fibers as the shaft 18 is rotated. Light source 20 may comprise any of a number of known devices which are capable of projecting a beam of light which is intensity modulated by electrical signal current, as, for example, a modulated glow tube or a tungsten light source having a ribbon modulator. These devices are well-known and are available commercially. Alternatively a laser could be used as the light source. In the preferred embodiment, the light source also includes a lens (not shown) for focusing light beam 22 to a spot of approximately .001 inch in diameter.

Located adjacent one side of helical mounting member 12 is a photosensitive medium 24 such as photographic film or photosensitive paper. Photosensitive medium 24 is advanced past the mounting member 12 at a relatively low rate of speed. The photosensitive medium is shown as being mounted on a rotatable mounting roller 25, although other devices for advancing the medium could alternatively be used. The mounting roller 25 may advantageously be geared to the drive shaft 18 to ensure a desirable speed ratio between the roller 25 and the drive shaft 18.

When the device is assembled, the light source 20 is positioned with respect to photosensitive medium 24 such that light beam 22 is directed at the first end of the particular optical fiber which is nearest the photosensitive medium 24. For example, in FIG. 1 the light beam 22 is directed at the first end of the particular optical fiber having its second end 15' immediately adjacent the photosensitive medium. This orientation can normally be accomplished by locating light source 20 and roller 25 at the same radial angle with respect to the central axis defined by drive shaft 18. Assuming that all the optical fibers are uniformly spaced, as will be described hereafter, each successive optical fiber will then receive light from light source 20 at the same instant that its respective second end 15 is immediately adjacent the photosensitive medium.

In operation, shaft 18 is driven at a relatively high rate of speed, while photosensitive medium 24 is advanced at a relatively low rate of speed. Energy from signal source 21 modulates the intensity of light delivered by light source 20 into successive optical fibers 13 as the scanner 10 is rotated. The light received by each optical fiber is transmitted to its second end 15 where it is projected against photosensitive medium 24 to produce a spot. When the shaft 18 is rotated in the direction shown in FIG. 1 the spots produced by successive second ends 15 are successively displaced to the right to form a scan line across the width of photosensitive medium 24. A visible trace is therefore left on the medium with each successive rotation of the scanner which is representative of the time-varying electrical signals delivered by source 21. It is apparent that scanner 10 is useful for making visual permanent displays of any of numerous kinds of data such as facsimile, sonar, radar, seismographic, and variable voltage or current data.

Figure 2:
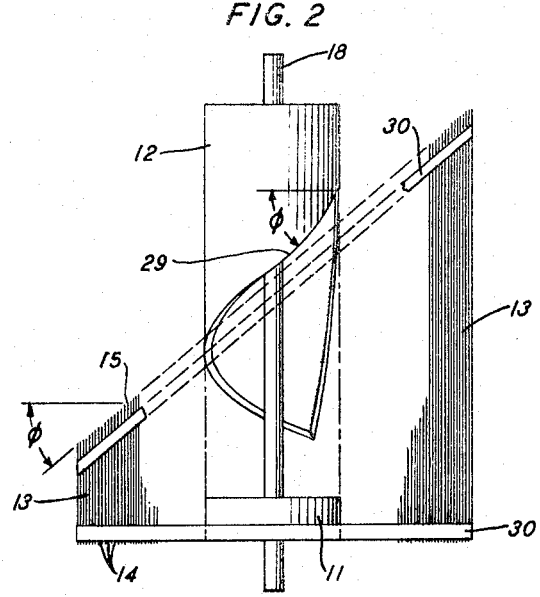
FIG. 2 illustrates a method for manufacturing the optical scanner of FIG. 1.

The scanner may be conveniently assembled by a method which is illustrated schematically in FIG. 2. The optical fibers 13 are first laid out in a closely spaced parallel array. As stated above, the optical fibers are preferably multifibers, each containing 36 extremely fine glass fibers. The ribbon formed by the multifibers may, for example, be four inches wide and six inches long, and contain approximately 1630 multifibers, each of which is spaced from the adjacent multifibers by .00005 inch. One end of the ribbon of multifibers is then cut at an angle $\varphi$ as, for example, an angle of 30 degrees. The maximum angle $\varphi$ is normally controlled by the index of refraction of the optical fibers. An angle which is too great may cause the light to be totally reflected rather than transmitted to the photosensitive medium 24. Prior to cutting, the relative spacings may be maintained by applying tapes 30, which may be, for example, adhesive Mylar strips, at opposite ends of the array.

The helical mounting member 12 and the annular mounting member 11 can advantageously be cut from a single hollow cylinder which ensures the same diameter for both mounting members. The helical mounting member is formed by cutting the cylinder at the same angle $\varphi$ as the multifiber ribbon to form a helical mounting surface 29. The annular mounting member 11 is, of course, made by cutting the cylinder to any appropriate thickness. It is not necessary, however, that both mounting members be of the same diameter provided that the spacings of the first ends 14 are uniform with respect to the spacings of the second ends 15.

After the mounting members 12 and 13 are attached to drive shaft 18, the array of optical fibers 13 is mounted on the mounting members 11 and 12 by, for example, gluing or taping. Next, the assembly is filled and covered with an epoxy 17 shown schematically in FIG. 1. The ends 14 and 15 are preferably allowed to protrude from the epoxy as it is initially applied. The epoxy and the ends 14 and 15 are then ground down and polished so that the fiber ends are well defined and flush with the epoxy coating. If the optical fibers are uniformly spaced initially when adhesive tapes 30 are applied, and if normal precautions are observed, their uniformity will be maintained throughout the assembly process.

I have found that scanner 10 is particularly useful for reproducing periodic or recurring data of the type generated by sonar and seismographic apparatus. For uses of this type it is quite easy to synchronize the rotation of drive shaft 18 with the recurrent data such that the scanner makes one revolution during each period of the recurrent data. However, scanner 10 presents a drawback in that one or more optical fibers 13 may break during the assembly of the scanner. Experience has shown that if the preferred multifibers are used, a breakage rate of 2%, or one multifiber in 50, can be expected during assembly. For most scanning operations such a maximum breakage rate could be tolerated, but if the device is synchronized with periodic recurring data this maximum breakage could lead to a distorted or misleading display on the photosensitive medium 24. This is because the same increment of recurrent information would be lost to the same broken optical fiber during each of the synchronized revolutions of the scanning device.

Figure 3:
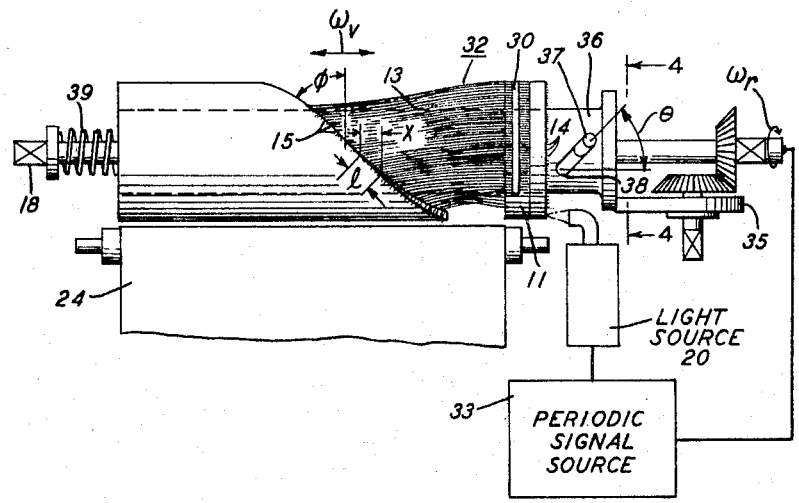
FIG. 3 is a schematic view of another embodiment of the invention.

Referring now to FIG. 3, there is shown a modified optical scanner 32 which avoids the loss of a recurrent increment of data delivered by a periodic signal source 33 because of a possible break in one of the optical fibers. The operation of scanner 32 is the same as the device of FIG. 1 and its component parts have been numbered accordingly. Light source 20, which delivers variable intensity light to be recorded on photosensitive medium 24, is modulated by a periodic signal source 33. Signal source 33 is shown as being connected with drive shaft 18 to indicate that the rotation of the shaft is synchronized with the recurrent signals from source 33. More specifically, the optical scanner makes one revolution for each period of the signal energy from source 33.

Figure 4:
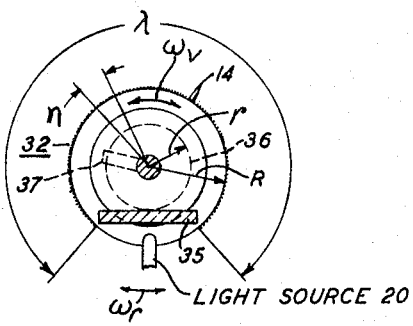
FIG. 4 is a view taken along lines 4—4 of FIG. 3.

Geared with optical scanner 32 is a rotatable cam 35 for imposing a slow oscillatory component $\omega_v$ which is both axial as shown in FIG. 3 and angular as shown in FIG. 4. The purpose of this oscillatory component is to displace the optical fibers slightly during each revolution of the optical scanner so that the same recurrent information is not transmitted by the same optical fiber during each successive revolution. This displacement is made without interfering with the synchronism between the revolving scanner and the periodic signal source. In other words, the same recurrent information will be recorded at the same axial distance along photosensitive medium 24 in spite of the continuous displacement imposed by the cam 35.

The helical mounting member 12 and the annular mounting member 11 are not rigidly attached to the drive shaft 18 as in FIG. 1, but rather they are attached to a central housing member 36 which is slideably mounted on drive shaft 18. The housing and the two mounting members are made to rotate with the drive shaft 18 by a pin 37 which is attached to the drive shaft and which extends through a slot 38 at one end of the housing 36. The housing 36 is mechanically biased against the cam 35 by a spring 39 which bears against the helical mounting member 12. Cam 35 is preferably a uniform rise and fall cam which displaces housing 36 axially a small distance with each revolution of the drive shaft 18. Simultaneously, the cam angularly displaces the housing because slot 38 extends at an angle $\theta$ with respect to the central axis; any axial movement of the housing 36 with respect to connecting pin 37 therefore gives the housing an angular twist. The resulting axial and angular displacement frequencies $\omega_v$ are, of course, equal to the frequency of rotation of the cam 35. The net frequency of rotation of the scanner is equal to the drive shaft frequency plus or minus $\omega_v$.

Preferably, the array of optical fibers are angularly displaced by a distance equaling one fiber during each revolution of the drive shaft 18. The cam 35 may advantageously be geared with drive shaft 18 to rotate at a frequency equal to one-twentieth of the drive shaft frequency. Under these conditions, the array of fibers will be displaced a maximum circumferential distance equaling the width of 10 optical fibers in 10 revolutions of the drive shaft, and after 20 revolutions of the drive shaft will return to its initial location. Hence, if one of the optical fibers is broken the same recurrent information will be lost only once during 20 scans of the scanning device.

In order to maintain the required relative orientation of light source 20 with respect to photosensitive medium 24 the axial displacement of the optical scanner 32 must be related to its angular displacement such that the oscillatory component $\omega_v$ moves the scanner in the manner of an advancing screw. As explained above, the first end 14 of each optical fiber must receive light from the light source at the same instant that its second end is immediately adjacent the photosensitive medium. Therefore, with each angular displacement $\eta$, shown on FIG. 4, the optical fibers must be displaced a particular axial distance $x$ and helical distance $l$. If the ratio of the helical displacement $l$ to the length of the entire helical line defined by second ends 15 is equal to the ratio of $\eta$ to the entire angle $\lambda$ subtended by the first ends 14, then the proper relative orientations of the light source 20, the optical fibers 13, and the photosensitive medium 24 will be maintained. In other words, $$\frac{l}{L} = \frac{\eta}{\lambda} \quad (2)$$

where L is the length of the helix defined by second ends 15. The axial displacement $x$ is related to the helical displacement $l$ by $$x = l \sin \varphi \quad (3)$$

Combining Equations 2 and 3 gives $$x = L \frac{\eta}{\lambda} \sin \varphi \quad (4)$$

Equation 4 gives the proper relationship of the desired axial displacement $x$ with respect to a given angular displacement $\eta$. It is quite possible that mechanisms other than that shown in FIG. 3 could be used for fulfilling the condition of Equation 4. However, the device of FIG. 3 is preferred because of its simplicity. The design of this device so as to fulfill the requirements of Equation 4 will be discussed next.

The length L of the helix defined by the second ends 15 can be determined by the relationship $$L = \frac{\pi R \lambda}{180 \cos \varphi} \quad (5)$$

where R is the radius of the helix and the arc defined by first ends 14 as shown in FIG. 4 and the angles are expressed in degrees. From Equations 4 and 5

$$x = \frac{\pi R \eta \tan \varphi}{180} \quad (6)$$

From inspection of FIGS. 3 and 4 it can be seen that the angle $\theta$ of slot 38 is related to the axial displacement $x$ by $$\tan \theta = \frac{\pi r \eta}{180 x} \quad (7)$$

where $r$ is the radius of housing 36. From Equations 6 and 7

$$\tan \theta = \frac{r}{R \tan \varphi} \quad (8)$$

Equation 8 defines the angle $\theta$ at which slot 38 should be cut.

Assuming a helix angle $\varphi$ of 30 degrees, a maximum shift of 10 optical fibers during each revolution of cam 35, and a width of each optical fiber of .0024 inch, the maximum axial displacement $x'$ can be computed from Equation 3.

$$x' = .0024 \cdot 10 \cdot \sin 30° \quad (9)$$

$$x' = .012 \text{ inch} \quad (10)$$

The maximum axial displacement $x'$ is, of course, equal to the maximum eccentricity or maximum rise of cam 35.

Figure 5:
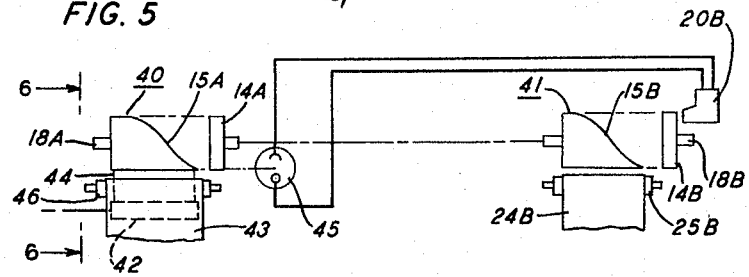
FIG. 5 is a schematic view of another embodiment of my invention.

Referring now to FIG. 5 there is shown a facsimile transmitting system in accordance with my invention comprising an optical scanner 40 which functions as a transmitting transducer and an optical scanner 41 which functions as a receiving trandsucer. Scanners 40 and 41 are identical to the scanner of FIG. 1, with the corresponding elements of scanner 40 being designated by the letter A and the corresponding elements of scanner 41 being designated by the letter B. Adjacent one side of scanner 40 is a steady state light source 42 which directs an extended light beam 44 through a partially transparent medium 43 onto the scanner 40. Imprinted on medium 43 is an image or picture which is intended to be transmitted to, and reproduced by, scanner 41. Located adjacent the first ends 14A of the optical fibers of scanner 40 is a photoelectric cell 45 which is responsive to light projected by successive first ends 14A as scanner 40 is rotated. An appropriate lens is normally included between the scanner and the photoelectric cell to focus the light from successive optical fibers. The electrical energy output of photoelectric cell 45 is connected to light source 20B and serves to modulate the intensity of the light output of source 20B.

Figure 6:
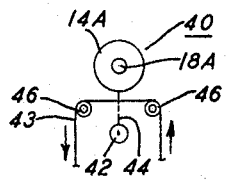
FIG. 6 is a view taken along lines 6—6 of FIG. 5.

In operation, partially transparent medium 43 is advanced between scanner 40 and light source 42 as, for example, by driving rollers 46 shown on FIG. 6. The intensity of the light from source 42 that reaches the second ends 15A of the optical fibers of scanner 40 is modulated by the variations in transparency of medium 43 by the image or picture which is imprinted thereon. As scanner 40 rotates, the optical fibers therefore receive variable intensity light which is transmitted to the photoelectric cell 45. The photoelectric cell converts this variable intensity light to modulated electrical energy which is then used to modulate the light output of light source 20B.

The receiving scanner 41 operates in the same manner as the device of FIG. 1 to reproduce the information received by light source 20B. The variable intensity light projected by source 20B is transmitted by the optical fibers of scanner 41 to the second ends 15B which scan the advancing photosensitive medium 24B. Drive shafts 18A and 18B are shown as connected by dotted lines to indicate that they rotate in synchronism with each other. Likewise, rollers 46 which drive the partially transparent medium, and roller 25B which drives the photosensitive medium, are synchronized. Under these conditions, the image imprinted on medium 43 will be reproduced on photosensitive medium 24B. Any of various known devices can be used for synchronizing the driving means of the transmitter and the receiver. Since the data transmitted to the receiving scanner 41 is not periodic or recurrent, there is no necessity for the cam mechanism of FIG. 3.

The foregoing discussion has shown how inexpensive and simple facsimile transmission systems and recording systems can be made in accordance with my invention. In spite of their simplicity, these devices are capable of making very accurate reproductions. As pointed out above, the optical fibers are preferably glass multifibers which are spaced apart by .00005 inch or less. The input light which is directed into first ends 14 or 14B can be focused to a spot of .0016 inch in diameter. The photosensitive medium 24 or 24B can then be advanced at a speed relative to the scanner to give a resolution of 312 lines per inch which will result in an estimated maximum deviation of light intensity of only 4% with a fiber spacing of .00005 inch. It is estimated that a 500 line per inch resolution with a .001 inch spot and a .00005 inch fiber spacing would give an intensity variation of 8%. It is expected that further development can increase even further the accuracy and resolution attainable by the described optical scanner.

The disclosed embodiments are merely intended to be illustrative of the invention. Various other modifications can be made without departing from the spirit and scope of the invention.

What is claimed is:

1. A device for optically scanning a medium which is linear in one dimension and which is capable of being advanced in a direction perpendicular to the linear dimension comprising:
    an array of optical fibers located adjacent the medium;
    first ends of the fibers being arranged along a circular path;
    second ends of the fibers being arranged along a helical path;
    the circular and helical paths having a common axis which is parallel to the said linear dimension of the medium;
    and means for rotating the array of fibers, whereby the second ends of the optical fibers scan the medium.

2. A scanning device comprising:
    a central shaft;
    a first cylinder mounted on the shaft;
    a second cylinder mounted on the shaft;
    the second cylinder being hollow and being cut at an angle to form a helical portion;
    a plurality of optical fibers being mounted at one end on the periphery of the first cylinder and at the other end on the helical portion of the second cylinder;
    means for rotating the shaft, the mounting cylinders, and the plurality of optical fibers;
    means for directing light into successive first ends of the optical fibers during rotation;
    and means for detecting the light at successive second ends of the optical fibers.

3. The scanning device of claim 2 wherein the first ends of the optical fibers are located on the periphery of the first cylinder and the second ends are located on the helical portion of the second cylinder;
    the detecting means comprises a photosensitive medium;
    and further comprising means for advancing the photosensitive medium past the second ends of the optical fibers.

4. The scanning device of claim 3 further comprising means for superimposing an oscillating component to the rotation of the first and second mounting cylinders and for simultaneously imposing an axial oscillation to the first and second mounting cylinders;
    the axial displacement $x$ of the mounting cylinder being related to the angular displacement $\eta$ of the oscillating component of rotation substantially according to the relationship $$x = L \frac{\eta}{\lambda} \sin \varphi$$

where L is the total length of a line interconnecting the second ends of the fibers, $\lambda$ is total angle subtended by the line interconnecting the second ends, and $\varphi$ is pitch angle of the helical portion upon which the second ends are mounted.

5. The scanning device of claim 2 wherein the first ends of the optical fibers are located on the helical portion of the second cylinder and the second ends are located on the periphery of the first cylinder;
    the light directing means comprises a source of light in proximity to the first ends of the optical fibers with a medium of variable transparency located between the source and the first ends;
    and the light detecting means comprises a photocell for converting light energy to electrical energy.

6. A scanning device comprising:
    a central shaft;
    first, second, and third hollow cylinders rigidly connected together and surrounding the central shaft;
    the first cylinder having a slot through its outer surface which extends at an angle $\theta$ with respect to the central axis of the shaft;
    a pin rigidly connected to the shaft and extending through the slot;
    means for mechanically biasing one end of the slot against the pin;
    the third cylinder being cut at an angle to form a helical portion;
    a plurality of optical fibers;
    a first end of the fibers being mounted on the periphery of the second cylinder;
    a second end of the fibers being mounted on the helical portion of the third cylinder;
    means for rotating the shaft, thereby rotating the first, second, and third cylinders;
    means for directing light energy into successive first ends of the optical fibers;
    a photosensitive medium adjacent the third cylinder;
    and a rotatable cam for periodically displacing the first, second, and third cylinder axially against the mechanical biasing means;
    the angle $\theta$, the radius $r$ of the first cylinder, the radius R of the third cylinder, and the pitch of the helical portion being related substantially according to the relationship $$r = R \tan \theta \tan \varphi$$

7. A facsimile transmission system comprising:
    a first transducer;
    a second transducer;
    each transducer comprising a central shaft, a first cylinder mounted on the shaft, a second cylinder mounted on the shaft, and an array of optical fibers;
    each second cylinder being cut at an angle to form a helical portion;
    first ends of each array of optical fibers being mounted on the periphery of their respective first cylinder with second ends thereof being mounted on the helical portions of their respective second cylinder;

means for rotating the shafts, thereby rotating the mounting cylinders and the arrays of optical fibers;

means for directing variable intensity light into successive second ends of the optical fibers of the first transducer;

means for detecting light from successive first ends of the optical fibers of the first transducer and for converting said light to electrical energy;

means for converting said electrical energy to light and for directing such light into successive first ends of the optical fibers of the second transducer;

and means for detecting light from the successive second ends of the optical fibers of the second transducer.

8. A scanning device comprising:

a first mounting member;

a second mounting member coupled with the first mounting member;

a plurality of optical fibers;

a first end of each fiber being mounted on the first mounting member with a second end thereof being mounted on the second mounting member;

a line interconnecting the first ends describing an arc of a circle;

a line interconnecting the second ends describing a helix segment;

and means for rotating the first and second mounting members.

9. The scanning device of claim 8 further comprising:

a light responsive medium adjacent to one side of the second mounting member;

an optical device for directing light into successive first ends of the optical fibers;

the optical device being oriented with respect to the light responsive medium such that the second end of each optical fiber is nearest the medium at the same time that its first end is nearest the optical device.

10. The scanning device of claim 8 further comprising:

means for directing light into successive second ends of the optical fibers;

the light directing means being located adjacent one side of the second mounting member;

a light responsive device for receiving light from successive first ends of the optical fibers;

the light responsive device being oriented with respect to the light directing device such that the second end of each optical fiber is nearest the light directing device at the same time that its first end is nearest the light responsive device.

11. A facsimile transmitting system comprising:

a first transducer;

a second transducer;

each transducer comprising a first mounting member, a second mounting member coupled to the first mounting member, and an array of optical fibers;

first ends of each array of optical fibers being mounted on the first mounting member and describing a segment of a circle;

second ends of each array of optical fibers being mounted on the second mounting member and describing a helix segment;

means for rotating the first and second mounting members of each transducer;

first means for directing variable intensity light into successive second ends of the optical fibers of the first transducer;

first means for detecting light from successive first ends of the optical fibers of the first transducer and for converting said light to electrical energy;

said first light detecting means being oriented with respect to the first light directing means such that the second end of each optical fiber is nearest the first light directing means at the same time that its first end is nearest the first light detecting means;

second means for converting said electrical energy to variable intensity light and for directing the variable intensity light into successive first ends of the optical fibers of the second transducer;

and second means for detecting light from successive second ends of the optical fibers of the second transducer;

said second light detecting means being oriented with respect to the second light directing means such that the second end of each optical fiber of the second transducer is nearest the second light detecting means at the same time that its first end is nearest the second light directing means.

12. A scanning device comprising:

a central shaft;

first and second mounting members mounted on said shaft;

an array of energy transmitting fibers;

a first end of each fiber being mounted on the first mounting member;

a second end of each fiber being mounted on the second mounting member;

the first ends of the array being arranged along a circular path;

the second ends of the array being arranged along a helical path;

means for directing energy into successive first ends of the fibers;

an energy-responsive medium adjacent the second mounting member and arranged with one dimension parallel to the central axis of the shaft;

means for advancing the medium in a direction perpendicular to the axis of the central shaft;

and means for rotating the central shaft and first and second mounting members, whereby the second ends scan the advancing medium.

References Cited by the Applicant

UNITED STATES PATENTS 2,443,258    6/1948    Lindenblad.

FOREIGN PATENTS 276,084            Great Britain.

DAVID G. REDINBAUGH, *Primary Examiner.*

R. L. RICHARDSON, *Assistant Examiner.*